358-86 SR

PTU48 XR 3,665,311

United States Patent

Gargini

[15] 3,665,311

[45] May 23, 1972

[54] WIRED BROADCASTING SYSTEMS

[72] Inventor: Eric J. Gargini, West Drayton, England

[73] Assignee: Communications Patents Limited

[22] Filed: June 2, 1970

[21] Appl. No.: 42,773

[30] Foreign Application Priority Data

June 6, 1969 Great Britain ........................28870/69

[52] U.S. Cl. ..........................325/53, 178/DIG. 13, 325/308

[51] Int. Cl. ..........................................................H04h 1/02

[58] Field of Search.............179/2 TV; 178/DIG. 13, DIG. 9, 178/DIG. 15; 325/308, 51, 53, 54, 57; 343/176, 177

[56] References Cited

UNITED STATES PATENTS

| | | | |
|---|---|---|---|
| 2,142,339 | 1/1939 | Weaver | 179/2 TV |
| 2,031,075 | 2/1936 | Scheibell | 178/6 PD |
| 3,366,731 | 1/1968 | Wallerstein | 325/308 |
| 2,241,586 | 5/1941 | Dorsman | 178/6 PD |
| 3,524,935 | 8/1970 | Gonsewski | 179/2 DP |
| 3,281,695 | 10/1966 | Bass | 178/6 PD |
| 3,188,384 | 6/1965 | Townsend | 178/6 PD |
| 2,577,731 | 12/1951 | Berger | 178/6 PD |
| 3,105,873 | 10/1963 | Winston | 178/6 PD |
| 3,426,145 | 2/1969 | Kimball | 178/6 PD |
| 2,189,287 | 2/1940 | Hershey | 178/6 PD |

*Primary Examiner*—Kathleen H. Claffy
*Assistant Examiner*—Tom D'Amico
*Attorney*—Laurence R. Brown

[57] ABSTRACT

Wired broadcasting systems provide for originating programs at the subscriber station for transmissions over the same signal conductors for receiving programs. Central equipment makes the subscriber originated programs available for other subscribers.

25 Claims, 1 Drawing Figure

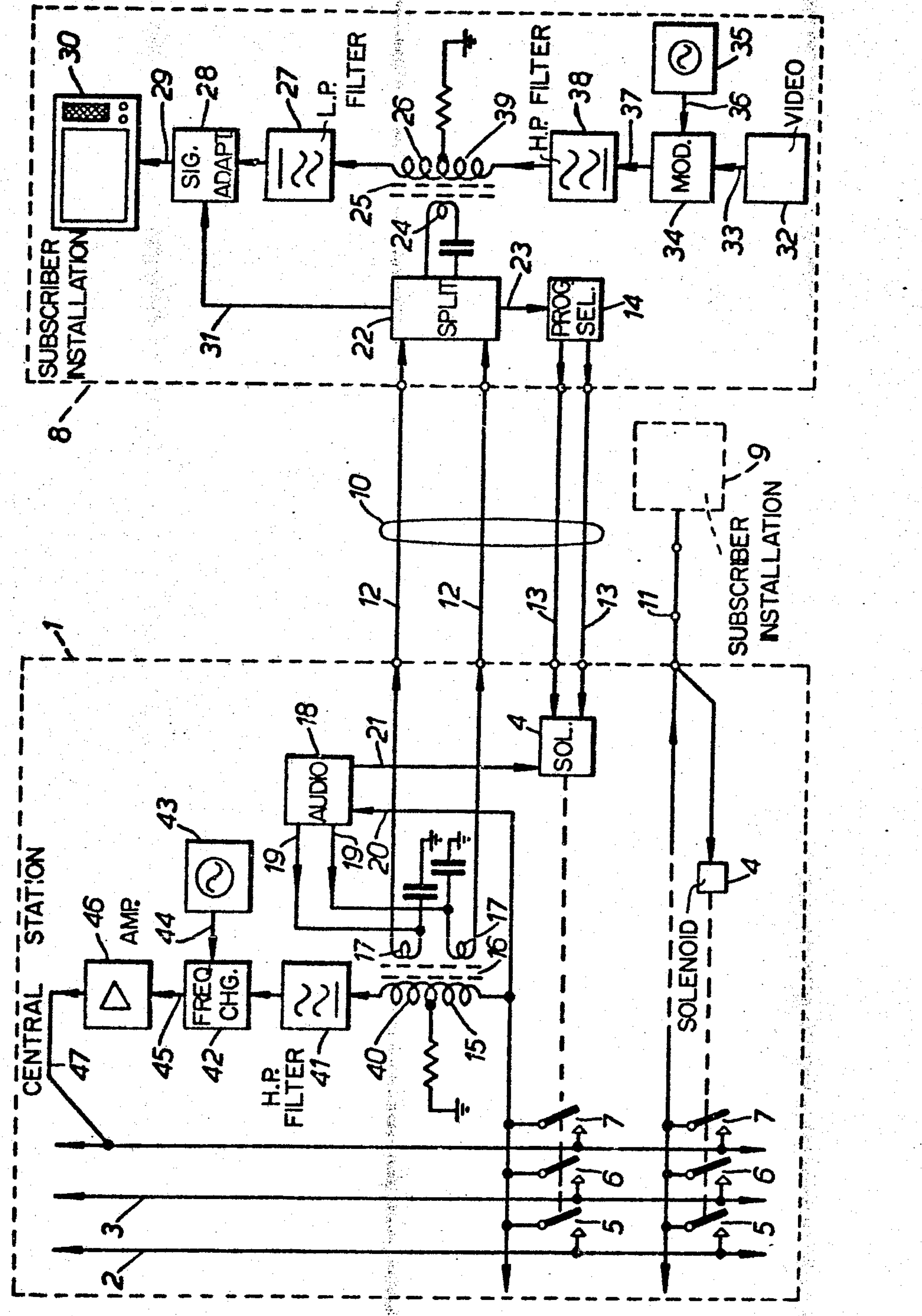
INVENTOR
ERIC J. GARGINI
BY Laurence R. Brown
ATTORNEY

WIRED BROADCASTING SYSTEMS

This invention relates to a wired broadcasting systems and seeks to provide an improved form thereof.

It is an object of the present invention to provide a wired broadcasting system in which at least one subscriber is enabled to originate a program transmission which can subsequently be made available to another or other subscribers to the system.

According to one feature of the invention there is provided a wired broadcasting system in which at least one subscriber is provided with means for originating a program transmission, means for returning said program transmission to a central station of the system over the same signal conductors by means of which said subscriber is enabled to receive other programs from said central station and means are provided at said central station which serve to make the subscriber originated program transmission available to at least one other subscriber in the same manner as said other programs are made available.

According to a further feature of the invention there is provided a wired broadcasting system arranged for the distribution of television signals as modulated high frequency carrier waves in which at least one subscriber is provided with means for originating a television program transmission, means are provided for returning said program transmission to a central station of the system over the same signal conductors by means of which said subscriber is enabled to receive other programs from said central station as a modulated carrier wave signal lying at least partly outside the band of frequencies employed for the distribution of television signals from said central station and frequency translating means are provided at said central station which serve to translate the subscriber originated television program transmission to the frequency band employed for the distribution of television signals from said central station.

According to a more detailed feature of the invention there is provided a wired broadcasting system arranged for the distribution of a plurality of television signals as modulated by frequency carrier waves in which program selection is arranged to be affected at a program exchange by the selective connection of a signal distribution line in respect of each subscriber to one or other of a plurality of signal highways and at least one subscriber is provided with means for originating a television program transmission, means are provided for returning said program transmission to the program exchange as a modulated carrier wave signal lying at least partly outside the band of frequencies employed for the distribution of television signals from said program exchange, frequency translating means are provided at said central station for translating said subscriber originated television program transmission to the frequency band employed for the distribution of television signals from the program exchange together with means for applying said frequency translated subscriber originated television program transmission to a signal highway reserved, at least for a proportion of time, for the use of said one subscriber whereby other subscribers of said system are enabled to derive signals from said reserved signal highway in the same manner as other signals are derived from other signal highways.

Further features and advantages of the invention will become apparent form the following description of one particular embodiment thereof, given by way of example only, with reference to the accompanying drawing which is a block schematic diagram of part of a wired broadcasting system in accordance with the present invention.

The wired broadcasting system shown in the drawing includes a central station 1 arranged to operate as a program exchange, that is, it is arranged to provide a plurality of television programs, such for example, as those received from a television broadcasting transmitter, which are made available on corresponding signal highways two of which are shown at 2,3, and from which signals may be derived for transmission to a subscriber through the intermediary of a program selection means, for example, in the form of a solenoid 4 arranged to actuate corresponding contacts 5,6,7, through which signals on one of the signal highways may be passed to the subscriber's installation 8/9 by way of a corresponding cable connection 10/11.

The cables 10/11 each comprise a first pair of conductors 12 which are suitable for the transmission of modulated high frequency carrier waves pertaining to the television transmission and a second pair of conductors 13 which serve for the transmission of control signals for actuating the solenoid 4 from a program control device 14. Television signals passing from the program exchange to the subscriber are derived from the corresponding signal highway 2,3, through a switch contact 5,6, and thence to a first winding 15, of a hybrid transformer 16. A second, split, winding 17 of this transformer is arranged to feed signals to the corresponding subscriber's installation 8 over the conductors 12. Audio frequency signals in respect of the accompanying sound transmission together with direct current power is also passed to the subscriber over the line 12 from the unit 18 which is coupled to the winding 17 by means of the conductors 19 and receives audio frequency signals from the appropriate signal highway over the line 20. A direct current power connection 21 is arranged to extend from the solenoid 4 to the unit 18.

Signals arriving at the subscriber's installation 8 from the program exchange are passed through a coupling and sound/vision splitting unit 22 from which extends a connection 23 to the program selection controller 14 and a signal connection to the primary winding 24 of a further hybrid transformer 25. A second winding 26 of the transformer 25 is arranged to feed high frequency carrier waves in respect of the incoming television program through a low pass filter 27 to one input of a signal adapter 28 by means of which the high frequency carrier waves in respect of the television transmission are translated to a suitable frequency in, for example, the V.H.F. range for application, over the connection 29, to a television receiver 30. The signal adaptor 28 is also arranged to receive audio frequency signals from the central station over the line 31 from the coupling unit 22.

The subscriber's installation 8 is provided with means for originating a television program transmission. These means comprise a video frequency signal source 32 which may, for example, be formed by a television camera, output signals from which are applied over line 33 to a modulator device 34 which is also arranged to receive a carrier wave provided by an oscillator 35 over the line 36. The frequency of the carrier wave provided by the oscillator 35 is chosen such that the subscriber originated program transmission is in the form of a modulated carrier wave signal lying at least partly, and preferably wholly, outside the band of frequencies employed for the distribution of television signals from the program exchange to the subscribers of the network. The modulated carrier wave in respect of the subscriber originated television transmission is passed over the line 37 to a high pass filter 38 and thence to the third winding 39 of the hybrid transformer 25. The signals applied to this third winding 39 are passed to the first winding 24 and thence over the conductors 12 to the central exchange 1.

Signals arriving at the central station 1 from the subscriber 8 appear at the third winding 40 of the hybrid transformer 16 and pass through a high pass filter 41 to a frequency changer 42 by the intermediary of which they are translated to that frequency band which is employed for the distribution of television signals from the program exchange to the subscribers. The frequency translation is controlled by means of an oscillator 43 which is coupled to the frequency changer 42 over the line 44. The frequency translated signals in respect of the subscriber originated program appear on the line 45 and are then passed to an amplifier 46 by means of which their level is raised to an amplitude suitable for application to a spare signal highway 47 which may be reserved, at least for a proportion of time, for the use of the subscriber 8. By the appropriate actuation of their program selection means other subscribers of said system are enabled to derive signals from the signal highway 47 and thus receive the television program originated by the subscriber 8.

By virtue fo the fact that the subscriber originated transmission occupies a different frequency band from that of the normal distributed television programs, the possibility of such subscriber originated programs interfering with the normal distributed programs is reduced. Furthermore, the subscriber 8 is also enabled by means of appropriate actuation of his corresponding program selection device 4 to receive on his television receiver 30 the program which he is himself originating. Thus the receiver 30 can act as a monitor in respect of the television program which he is originating and adjustments affected to the video frequency signal source 32 to produce a satisfactory transmission as received by the receiver 30 will ensure that the overall circuit performance to other subscribers who may also be receiving his transmission is correct.

When several subscribers desire to originate their own television program transmissions it may be desirable to select the frequencies provided by their oscillators 35 to differ from one another so as to minimize the possibility of interference being caused to other users of the network. Conveniently, where several program originating subscribers share conductors in a common cable between them and the program exchange, their oscillator devices 35 may be arranged to provide carrier waves offset each from the others by about one third of the line scanning frequency of the television standard being employed. It is possible that by the employment of wider frequency differences between the subscribers oscillators 35 and by appropriate filtering at the program exchange 1 by the filters 41 that the signal highway on which a subscriber originated television program will appear may be chosen at the subscriber's equipment by a frequency selection means associated with the oscillator 35, the difference in the frequency bands occupied by their signals determining their routing at the program exchange.

Furthermore, where subscribers require to originate relatively low definition transmissions, such for example as might be required for data transmission purposes, the various subscriber originated transmissions may be pulse code modulated at, for example, line or frame frequency rate. In such cases these low definition transmissions may need to be received by the subscribers wishing to receive them with the aid of a television receiver provided with a storage tube so that a continuous presentation of the transmission is provided.

It is also possible to arrange, in an area served by a wired broadcasting system in accordance with the present invention, for the subscriber-originated program transmission to comprise at least pictures of the subscriber's premises or part thereof. These pictures may be made available at a monitoring station at which an observer would be able to observe events taking place at the subscriber's premises such for example as unauthorized entry or fire.

It may be desirable for subscriber-originated program transmissions relating to the protection of subscriber's premises to be effected in a different frequency range from other types of subscriber-originated program transmissions. For example, if programs are transmitted from the central station to subscriber's in the frequency band 4 – 11 MHz and subscriber-originated program transmissions are normally arranged to occupy a frequency band above 11 MHz the subscriber - originated program transmissions relating to the protection of subscriber's premises may be arranged to occupy a frequency band below 4 MHz.

Where a large number of subscriber - originated program transmissions are made available at a monitoring station the number of receivers provided for displaying the subscriber's transmissions may be less than said number of transmissions. In this event a program selection means of the type employed at the central station for the selection of subscriber's programs may be provided for determining which subscriber's transmission is displayed on a particular receiver at any time.

It may be arranged that each subscriber's transmission be applied to a signal sampling device which operates to provide an indication upon a change occurring in the picture signals, such for example as would occur if a moving object entered the field of view of the subscriber's camera. Such indication could be utilized to attract the attention of an operator at the monitoring station so that the subscriber's transmission concerned could be selected for display on a receiver to enable the cause of the changed picture signals to be determined.

It will be appreciated that by virtue of the physical connection which exists over the wired broadcasting network between the subscriber's premises and the monitoring station it is possible to provide means by which any one of a plurality of operations may be effected at the subscriber's premises under the control of an operator at the monitoring station. These operations could comprise, for example, the selection of a desired one of a plurality of television cameras, each giving a view of different parts of the subscriber's premises, for connection to the subscriber's program origination equipment, the control of pan and/or tilt of one or more of such cameras, the control of gate locks to permit or deny access to the subscriber's premises during his absence and any other operation adaptable to telecontrol.

I claim:

1. A wired broadcasting system including a central station, a plurality of program sources, a plurality of subcriber stations and central station control equipment selectively coupling subscribers to receive predetermined ones of the programs from said program sources in which at least one subscriber is provided with means for originating a program transmission, means for returning said program transmission to said control equipment of the system over the same signal conductors by means of which said subscriber is enabled to receive program sources from said program from said central station and means are provided at said central station which serve to make the subscriber originated program transmission available to at least one other subscriber in the same manner as said other programs are made available.

2. A wired broadcasting system including a central station, a plurality of program sources, a plurality of subscriber stations and central station control equipment selectively coupling subscribers to receive predetermined ones of the programs from said program sources, said system being arranged for the distribution of television signals as modulated high frequency carrier waves in which at least one subscriber is provided with means for originating a television program transmission, means are provided for returning said program transmission to said central station control equipment of the system over the same signal conductors by means of which said subscriber is enabled to receive other programs from said central station as a modulated carrier wave signal lying at least partly outside the band of frequencies employed for the distribution of television signals from said central station and frequency translating means are provided at said central station which serve to translate the subscriber originated television program transmission to the frequency band employed for the distribution of television signals from said central station.

3. A wired broadcasting system including a central station, a plurality of program sources, a plurality of subscriber stations and central station control equipment selectively coupling subscribers to receive predetermined ones of the programs from said program sources, said system being arranged for the distribution of a plurality of television signals as modulated high frequency carrier waves on corresponding signal highways in which program selection is arranged to be effected at a program exchange by the selective connection of a signal distribution line at each subscriber station to one or other of a plurality of signal highways carrying signals from said program sources and at least one subscriber station is provided with means for originating a television program transmission, means are provided for returning said program transmission to the program exchange on a cable providing television signals to the one said subscriber as a modulated carrier wave signal lying at least partly outside the band of frequencies employed for the distribution of television signals from said program exchange to said subscriber stations, frequency translating means are provided at said central station for translating said subscriber originated television program transmission to the frequency band employed for the distribution of television signals from the program exchange together with means for applying said frequency translated subscriber originated television program transmission to a signal highway reserved, at least for a proportion of time, for the use of said one subscriber whereby other subscribers of said system are enabled to derive signals from said reserved signal highway in the same manner as other signals are derived from other signal highways.

4. A wired broadcasting system as claimed in claim 2, wherein the means for returning a subscriber-originated program transmission to a central station of the system includes a three-part network of which a first part is arranged for connection of the signal conductors, a second part is arranged for connection to a television receiving equipment and a third part is arranged for connection to a television transmitting equipment, the signal transmission characteristics of said three part network being such that signals may pass without undue attenuation between said first part and said second part and between said third part and said first part while the path between sad second and third parts offers appreciable attenuation to signals.

5. A wired broadcasting system as claimed in claim 4, wherein a frequency selective filter is interposed between said third part and the television transmitting equipment which presents a negligible impedance to the signals produced by said television transmitting equipment and an appreciable impedance to program signals received from the central station.

6. A wired broadcasting system as claimed in claim 5, wherein the frequency selective filter is a high pass filter.

7. A wired broadcasting system as claimed in claim 4, wherein a frequency selective filter is interposed between said second part and the television receiving equipment which presents a negligable impedance to program signals received from the central station and an appreciable impedance to the signals produced by said television transmitting equipment.

8. A wired broadcasting system as claimed in claim 4, wherein said three part network comprises a hybrid transformer.

9. A wired broadcasting system as claimed in claim 2 wherein at the central station there are associated with a subscriber's signal conductors a further three part network of which a first part is arranged for connection to the signal conductors, a second part is arranged to receive the output signals of a television transmitting equipment and a third part is arranged for connection to signal receiving means for receiving subscriber-originated program transmissions, the signal transmission characteristics of said three-part network being such that signals may pass without undue attenuation between said first part and said third part and between said second part and said first part while the path between said second and third parts offers appreciable attenuation to signals.

10. A wired broadcasting system as claimed in claim 9, wherein a frequency selective filter is interposed between said second part and said signal receiving means which presents a negligible impedance to signals pertaining to subscriber-originated program transmissions and an appreciable impedance to program signals transmitted from the central station.

11. A wired broadcasting system as claimed in claim 10, wherein the frequency selectiver filter is a high pass filter.

12. A wired broadcasting system as claimed in claim 9, wherein a frequency selective filter is interposed between said second part and the television transmitting equipment which presents a negligable impedance to program signals transmitted from the central station and an appreciable impedance to signals pertaining to subscriber-originated program transmissions.

13. A wired broadcasting system as claimed in claim 9, wherein the signal receiving means includes a frequency changing device by the intermediary of which signals peitaining to subscriber-originated transmissions are translated to that frequency band employed for the transmission of programs from said central station to subscribers.

14. A wired broadcasting system as claimed in claim 13, whereing means are provided for applying a frequency-translated subscriber-originated program transmission to one of a plurality of signal highways from which signals may be derived by subscribers of the system.

15. A wired broadcasting system as claimed in claim 13, wherein the frequency translation means are arranged to apply frequency-translated subscriber-originated program transmission to one of a plurality of signal highways in dependance upon the carrier wave frequency of said subscriber-originated program transmissions.

16. A wired broadcasting system as claimed in claim 2, wherein programs transmitted from the central station to subscribers are arranged to occupy the frequency band 4 – 11 MHz, whilst subscriber-originated program transmissions are arranged to occupy a frequency band above 11 MHz.

17. A wired broadcasting system as claimed in claim 2 wherein two or more subscribers are provided with means for originating a program transmission and means are provided for ensuring that the carrier wave employed by one of said subscribers for program transmission has a frequency which differs from that of the carrier wave employed by the other subscriber.

18. A wired boradcasting system as claimed in claim 17, wherein the carrier waves employed by said two subscribers differ by approximatly one third of the line scanning frequency of the television being employed.

19. A wired broadcasting system as claimed in claim 2, wherein the subscriber -originated program transmission is made in accordance with a transmission standard different from that of the programs transmitted from the central station to subscribers and at least one subscriber is provided with means for receiving said different standard transmission.

20. A wired broadcasting system as claimed in claim 2, wherein means are provided for making available a monitoring station displaying at least one subscriber-originated program transmission of pictures of the subscriber's premises or part thereof.

21. A wired broadcasting system as claimed in claim 20, wherein the carrier wave employed for a transmission of pictures of a subscriber's premises has a frequency whichlies in a band different from that employed for other types of subscriber originated transmissions.

22. A wired broadcasting system as claimed in claim 21, wherein programs transmitted from the central station to subscriber's are arranged to occupy the frequency band 4 – 11 MHz, whilst subscriber-originated transmissions of pictures of the subscriber's premises are arranged to occupy a frequency band below 4 MHz.

23. A wired broadcasting system as claimed in claim 20, wherein a plurality of subscriber-originated program transmissions of pictures of the subscribers' premises are made available at the monitoring station and program selection means are provided whereby a lesser number of receivers may be conditioned to display a desired selection of said transmissions.

24. A wired broadcasting system as claimed in claim 23, wherein each subscriber-originated transmission of pictures of the subscribers' premises is applied to a signal sampling device effective to provide an indication upon a change occurring in the picture signals.

25. A wired broadcasting system as claimed in claim 23, wherein control means are provided at the monitoring station and connected over conductors of the wired broadcasting system to responsive means at the subscribers premises whereby apparatus at said subscriber's premises may be subjected to telecontrol from said monitoring station.

* * * * *